United States Patent
Bhattacharyya

(10) Patent No.: US 12,514,612 B2
(45) Date of Patent: Jan. 6, 2026

(54) ACCESS PORT TO INSUFFLATE THE ABDOMEN FOR LAPAROSCOPIC SURGERY

(71) Applicant: Eesha Rushmie Bhattacharyya, Honolulu, HI (US)

(72) Inventor: Eesha Rushmie Bhattacharyya, Honolulu, HI (US)

(*) Notice: Subject to any disclaimer, the term of this patent is extended or adjusted under 35 U.S.C. 154(b) by 0 days.

(21) Appl. No.: 18/675,339

(22) Filed: May 28, 2024

(65) Prior Publication Data

US 2025/0366885 A1 Dec. 4, 2025

(51) Int. Cl.
*A61B 17/34* (2006.01)
*A61B 17/00* (2006.01)
*A61B 17/42* (2006.01)

(52) U.S. Cl.
CPC .... *A61B 17/3423* (2013.01); *A61B 17/00234* (2013.01); *A61B 17/42* (2013.01); *A61B 2017/00238* (2013.01); *A61B 2017/00557* (2013.01); *A61B 2017/4225* (2013.01)

(58) Field of Classification Search
CPC ...... A61B 17/3423; A61B 2017/00557; A61B 17/00234; A61B 17/42; A61B 2017/4225; A61B 17/0218
USPC ........................... 600/201–245; 606/190–194
See application file for complete search history.

(56) References Cited

U.S. PATENT DOCUMENTS

| | | | |
|---|---|---|---|
| 4,198,981 A * | 4/1980 | Sinnreich | A61B 17/42 606/119 |
| 4,976,692 A * | 12/1990 | Atad | A61M 25/1011 604/101.03 |
| 5,104,377 A * | 4/1992 | Levine | A61M 25/1011 604/100.01 |
| 5,147,316 A | 9/1992 | Castillenti | |
| 5,439,476 A | 8/1995 | Frantzides | |
| 5,480,410 A | 1/1996 | Cuschieri et al. | |
| 5,634,911 A * | 6/1997 | Hermann | A61B 17/3423 604/246 |
| 6,234,958 B1 * | 5/2001 | Snoke | A61B 1/303 600/114 |
| 8,088,101 B2 * | 1/2012 | Chang | A61B 17/1604 604/96.01 |
| 8,292,919 B2 | 10/2012 | Mollenauer et al. | |
| 8,540,745 B2 | 9/2013 | Criscuolo et al. | |
| 9,345,604 B2 | 5/2016 | Alfrhan | |
| 9,451,877 B2 | 9/2016 | Okoniewski | |
| 10,226,589 B2 | 3/2019 | Albrecht et al. | |
| 2004/0153027 A1 | 8/2004 | Mantell | |
| 2014/0107558 A1 | 4/2014 | Gomez et al. | |
| 2017/0014155 A1 | 1/2017 | Norton et al. | |
| 2017/0150957 A9 | 6/2017 | O'Shea et al. | |
| 2018/0228698 A1 | 8/2018 | Ferzli | |
| 2022/0346832 A1 | 11/2022 | Mickus et al. | |
| 2023/0389960 A1 | 12/2023 | Haran et al. | |

FOREIGN PATENT DOCUMENTS

WO   WO-2007022050 A1 *  2/2007  ........ A61M 25/0017

* cited by examiner

*Primary Examiner* — Eduardo C Robert
*Assistant Examiner* — Tara Rose E Carter
(74) *Attorney, Agent, or Firm* — Dunlap Bennett & Ludwig PLLC

(57) ABSTRACT

An access port to insufflate the abdomen for laparoscopic surgery is disclosed, enabling easy access to the abdominal cavity to insufflate, visualize, operate and access other sites for entry safely if needed.

5 Claims, 3 Drawing Sheets

ACCESS PORT TO INSUFFLATE THE ABDOMEN FOR LAPAROSCOPIC SURGERY

BACKGROUND OF THE INVENTION

It is often difficult to obtain a suitable entry point into the abdominal cavity to insufflate and operate laparoscopically. Conventional trocars do not access the posterior cul de sac exclusively. Conventional trocars may have balloons but the spacing between them is too far apart, or they may only have one balloon to keep air from escaping.

The present invention is directed at overcoming shortcomings associated with conventional devices and methods to enable easy access to the abdominal cavity to insufflate, visualize, operate and access other sites for entry safely if needed. In a preferred embodiment, the present invention relates to medical devices and methods for use in connection with laparoscopic surgery and, more particularly, to a medical device that provides an access port to insufflate the abdomen for laparoscopic surgery.

SUMMARY OF THE INVENTION

In one aspect of the present invention, the invention is directed towards a medical device for providing an access port to insufflate the abdomen for laparoscopic surgery. In a preferred embodiment, the medical device comprises a rigid tube having a first end and a second end; an end cap with a valve positioned at the first end of the rigid tube; a first inflatable balloon and a second inflatable balloon positioned proximate the second end of the rigid tube; a first insufflation tube connected to the rigid tube at one end and having a stopcock at the opposite end; and a second insufflation tube connected to the rigid tube at one end and having a stopcock at the opposite end.

In another aspect of the present invention, the present invention is directed at a method of treating a patient for laparoscopic surgery comprising evaluating the posterior cul de sac. If the cul de sac appears free from masses and adhesions and is mobile, the method includes performing a posterior colpotomy, keeping the incision approximately 5 mm in width, inserting the medical device of the present invention in the posterior cul de sac, inflating the first and second balloons to a seal, and insufflating the abdominal cavity with a gas.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention overcomes difficulties associated with entry into the abdominal cavity to insufflate and operate laparoscopically.

Because of previous surgeries, adhesions or scar tissue are often present which can make it difficult to use conventional entry sites to operate laparoscopically. Entering the abdominal cavity through the posterior cul de sac is generally safer and easier to access. By creating an access port that will create an airtight seal we can then visualize and potentially operate through this port as well as safely insufflate the abdomen which may allow access to other sites more readily to perform anterior colpotomy.

The present invention is an improvement on what currently exists. There is no current device which allows insufflation and creates a seal of the posterior cul de sac. Conventional devices are more cumbersome to place and do not access the posterior cul de sac exclusively. In contrast, the device of the present invention enables easy access to the abdominal cavity to insufflate, visualize, operate, and access other sites for entry safely if needed.

Figure 1:
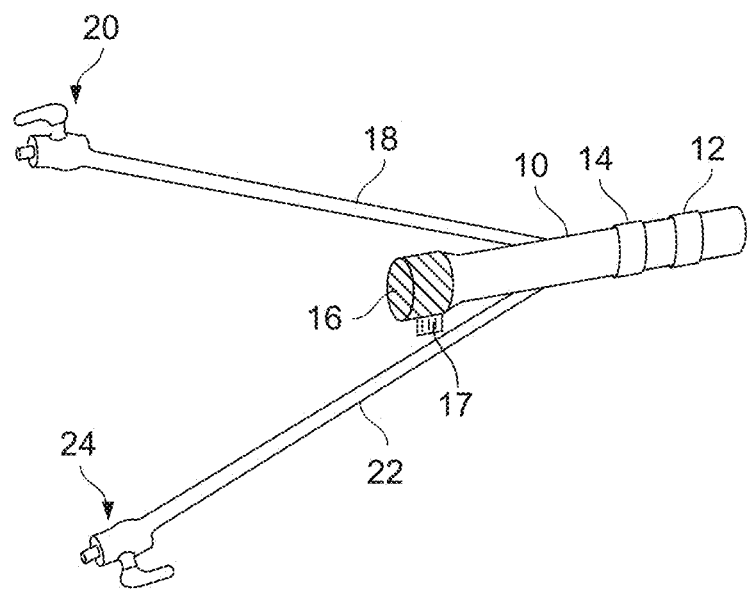
FIG. 1 is a schematic view of a preferred embodiment of the invention with the balloons uninflated.
Figure 2:
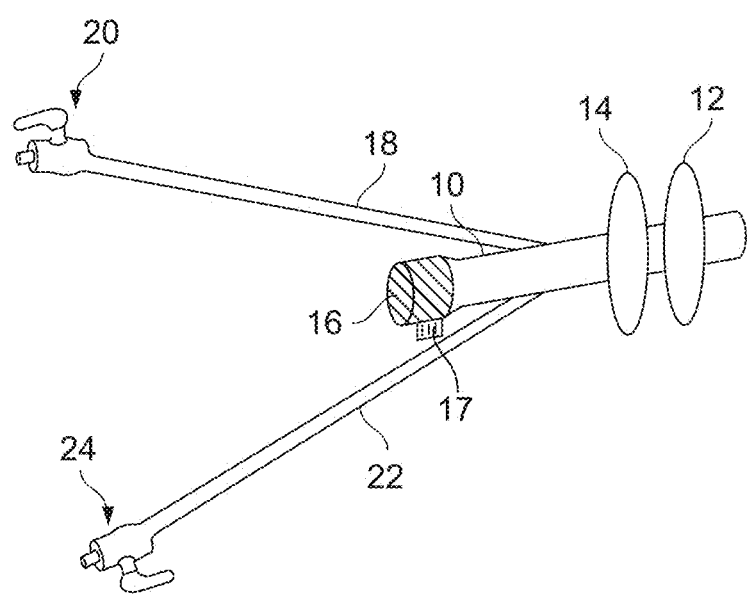
FIG. 2 is a schematic view of a preferred embodiment of the invention with the balloons inflated.
Figure 3:
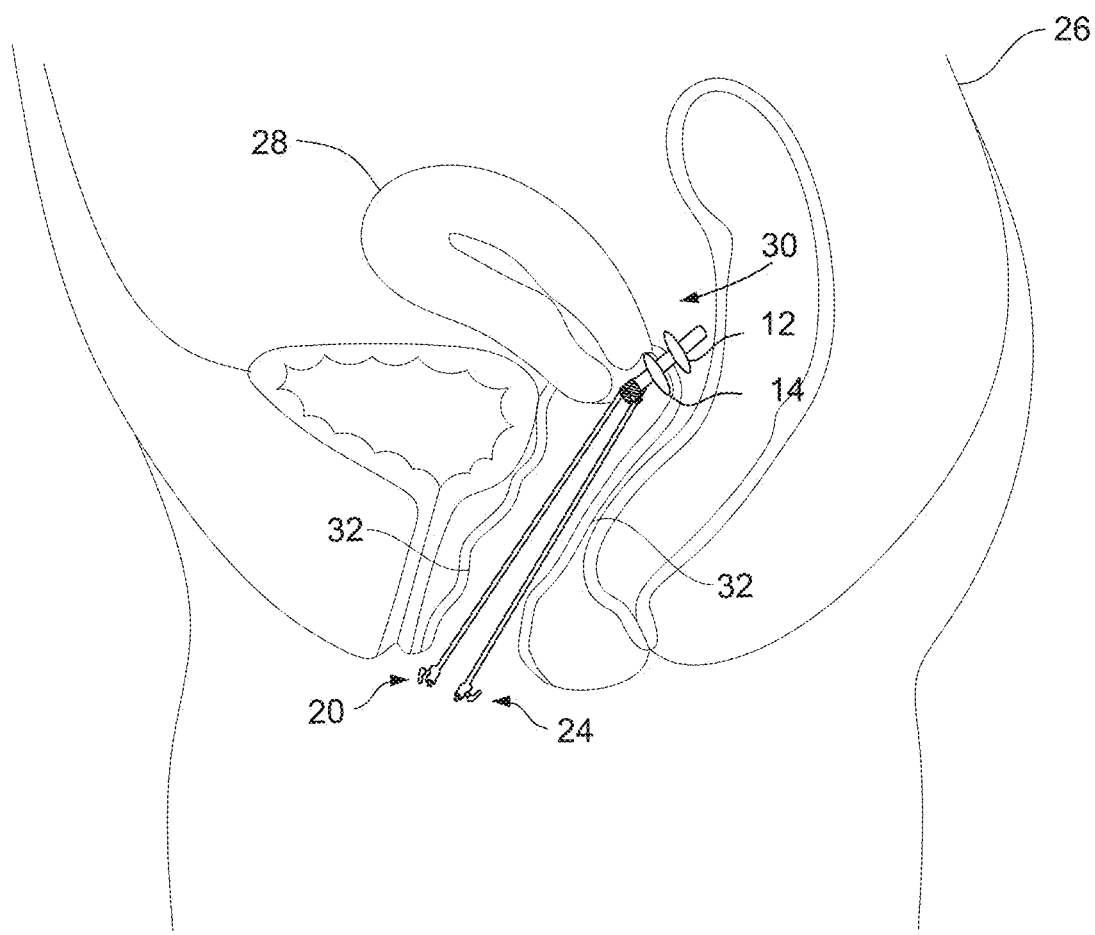
FIG. 3 is a schematic view of a preferred embodiment of the invention showing the invention in place in the abdomen by way of the posterior cul de sac.

As seen in FIGS. 1-3, in a preferred embodiment the device of the present invention comprises a rigid tube 10 having an end cap 16 at one end thereof. End cap 16 provides an air seal and includes a valve and a grasping tab 17. In a preferred embodiment, rigid tube 10 is approximately 7 cm in length and cap 16 at the proximal end of tube 10 includes a valve to act as an air seal and is also the point of attachment for the insufflation tube for the balloons as well as for the abdomen. Rigid tube 10 also includes a first ballon 12 and second balloon 14 proximate the end opposite the end cap 16. In a preferred embodiment, inflatable balloons 12 and 14 are approximately 0.3 cm apart, with first balloon 12 positioned proximate the end of rigid tube 10 and second balloon 14 positioned approximately 0.5 cm proximal to first balloon 12.

The device also includes a first insufflation tube 18 and a second insufflation tube 22 connected to rigid tube 10. In a preferred embodiment, first insufflation tube 18 and a second insufflation tube 22 are each approximately 10 cm in length. In a preferred embodiment, first insufflation tube 18 has one end connected to rigid tube 10 to insufflate both balloons, with the other end having stop cock 20 and an attachment to connect with an air-filled syringe. In a preferred embodiment, second insufflation tube 22 is approximately 10 cm in length connecting to cap 16 at the proximal end of rigid tube 10, with the other end having a stopcock 24 which will allow connection to inflation tubing.

As described in more detail below, and as seen in FIGS. 2 and 3 by way of example, when in use first insufflation tube 18 is designed and constructed to inflate the abdomen and second insufflation tube 22 is designed and constructed to inflate first balloon 12 and second balloon 14. First insufflation tube 18 includes a first insufflation port/stopcock 20 at one end thereof, and second insufflation tube 22 includes a second insufflation port/stopcock 24 at one end thereof.

Figure 4:
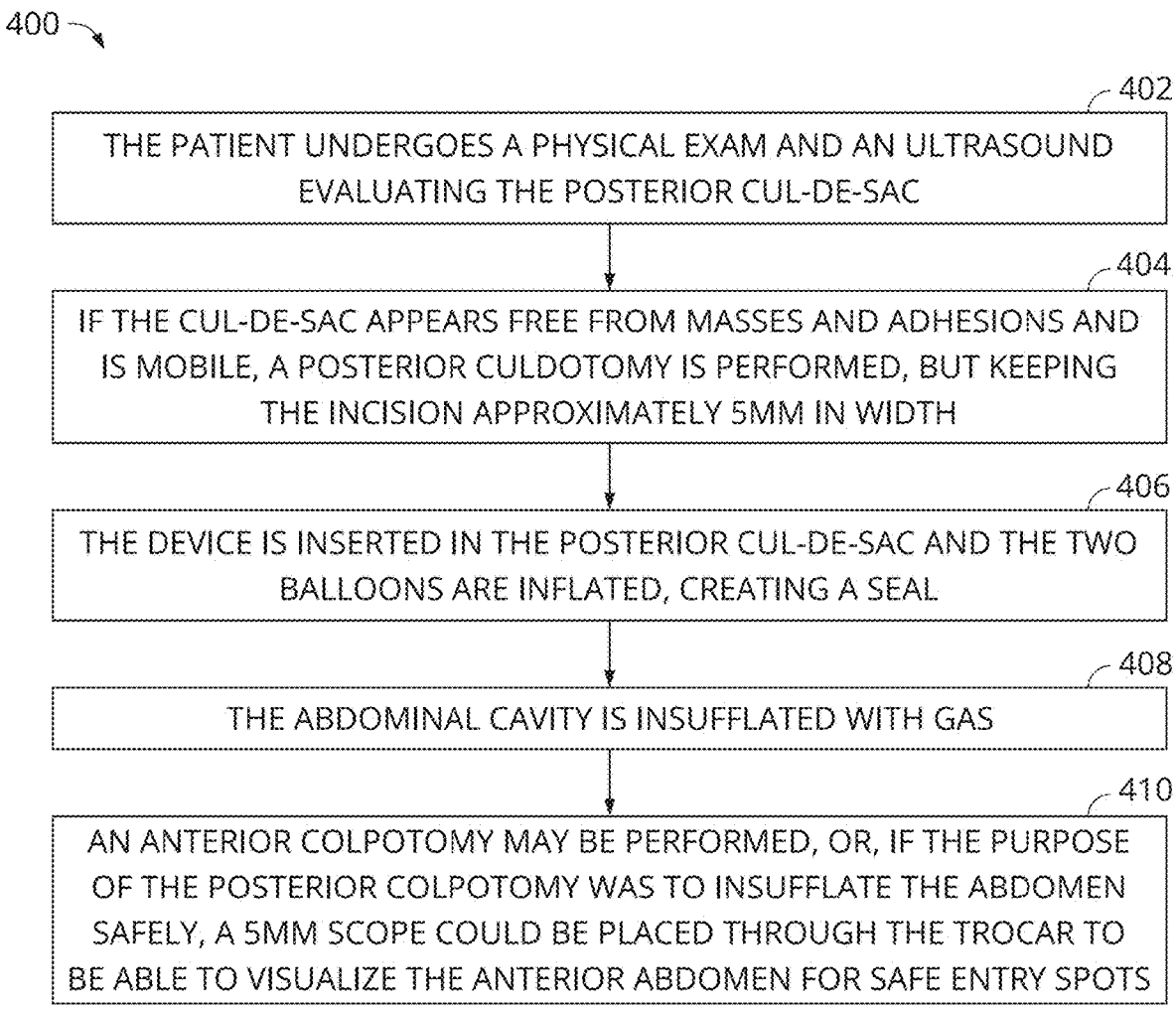
FIG. 4 is a process flowchart of a preferred embodiment of the invention.

As described herein, and as seen in FIGS. 3 and 4, prior to surgery patient 26 will have undergone a physical exam and preferably an ultrasound as well evaluating the posterior cul de sac 30 (FIG. 4, step 402). If the cul de sac 30 appears free from masses and adhesions and is mobile, a posterior colpotomy is performed, keeping the incision approximately 5 mm in width (FIG. 4, step 404). The incision is made at or slightly below the cervicovaginal junction through the vaginal wall 32 into the posterior cul de sac 30.

After ensuring positioning within the posterior cul de sac 30, balloons 12 and 14 would be inflated creating a seal (FIG. 4, step 406). The abdominal cavity would then be insufflated with gas (FIG. 4, step 408). At this point if we were wanting to perform an anterior colpotomy we would proceed to continue the dissection and the peritoneal window would become apparent due to the gas that has been instilled into the abdomen. If the purpose of the posterior colpotomy was to insufflate the abdomen safely, that could be done by placing a 5 mm scope through the trocar one would be able to visualize the anterior abdomen for safe entry spots and avoid injury to organs/bowel etc. (See FIG. 4, step 410).

In an alternative embodiment, removal of the valve and cap 16 would make the device smaller if the intention was to merely insufflate the abdominal cavity safely and access/perform the anterior colpotomy more safely than just insufflation may suffice, however that would not allow visualization of the abdominal/pelvic cavity. In addition, a smaller (shorter) device is contemplated without departing from the spirit of the invention, as sometimes a longer tube may get in the way and limit the angles that you can manipulate the instruments or the uterus. This smaller device would be approximately 2-3 cm in length with a flange to manipulate the device and hold it steady while introducing a scope or placing it into the incision site.

This invention makes insufflating the abdomen for laparoscopic surgery safer and easier. The entry point is the posterior cul de sac 30 which is not a common entry point. As described earlier, patient 26 would initially be evaluated with a physical exam and preferably an ultrasound to ensure that the posterior cul de sac was free of masses and adhesive disease. If the patient was undergoing a hysterectomy and difficulty was encountered with the anterior colpotomy, we could proceed with the posterior colpotomy with a smaller than normal incision, place the trocar, insufflate the balloons to allow a seal to occur, insufflate the abdominal cavity, which would allow visualization of a window to more easily access the anterior colpotomy. If the patient had prior abdominal surgery and there was a concern of adhesive disease on the anterior abdomen, then accessing the posterior cul de sac maybe be a safer alternative to then find safe areas to access the anterior abdomen for laparoscopic port placement. This may be helpful for other specialties such as general surgery, urology etc. who need to identify safe entry points for laparoscopic port placements.

It should be understood, of course, that the foregoing relates to exemplary embodiments of the invention and that modifications may be made without departing from the spirit and scope of the invention as set forth in the following claims.

What is claimed is:

1. A medical device for providing an access port to insufflate the abdomen for laparoscopic surgery via a posterior colpotomy and placement in the posterior cul-de-sac, comprising:
    a rigid tube having a first end and a second end, the rigid tube being dimensioned for placement into the posterior cul-de-sac;
    an end cap with a valve positioned at the first end of the rigid tube;
    a first inflatable balloon and a second inflatable balloon positioned proximate the second end of the rigid tube, the first inflatable balloon and the second inflatable balloon being spaced less than 1 cm apart to form a seal within the posterior cul-de-sac;
    a first insufflation tube connected to the rigid tube at one end and having a stopcock at the opposite end, the first insufflation tube being dedicated to insufflating the abdominal cavity; and
    a second insufflation tube connected to the rigid tube at one end and having a stopcock at the opposite end, the second insufflation tube being dedicated to inflating the first inflatable balloon and the second inflatable balloon.

2. The medical device of claim 1 wherein the length of the rigid tube is approximately 7 cm in length so as to reach the peritoneal cavity through the posterior cul-de-sac while maintaining external manipulation control.

3. The medical device of claim 1 wherein the first inflatable balloon and the second inflatable balloon are positioned approximately 0.5 cm apart, to provide an airtight seal in the confined anatomical space of the posterior cul-de-sac.

4. The medical device of claim 1 wherein first insufflation tube and second insufflation tube are each approximately 10 cm in length, thereby enabling manipulation of stopcocks external to the vaginal cavity to reduce infection risk and improve ease of handling.

5. The medical device of claim 1 wherein, in use, the first insufflation tube is designed and constructed to inflate the abdomen and the second insufflation tube is designed and constructed to inflate the first and second balloons, such separation preventing inadvertent over-inflation of the balloons and enhancing procedural safety.

\* \* \* \* \*